United States Patent Office
3,691,012
Patented Sept. 12, 1972

3,691,012
PROCESS FOR PRODUCING CITRIC ACID
Katsunobu Tanaka, Kazuo Kimura, and Ken Yamaguchi, Machida-shi, Japan, assignors to Kyowa Hakko Kogyo Co., Ltd., Tokyo, Japan
No Drawing. Continuation of application Ser. No. 692,690, Dec. 22, 1967. This application June 17, 1968, Ser. No. 737,373
Claims priority, application Japan, Dec. 28, 1966, 42/85,147
Int. Cl. C12d 1/04
U.S. Cl. 195—28 R     15 Claims

ABSTRACT OF THE DISCLOSURE

A process for producing citric acid by fermentation which comprises culturing a bacterium capable of assimilating hydrocarbons and belonging to the genus Arthrobacter in an aqueous nutrient medium containing n-paraffins as the principal source of carbon under aerobic conditions. Arthrobacter paraffineus is the preferred bacterium. The addition of calcium carbonate, urea, higher fatty acid salts or esters and methanol, as well as various kinds of surface active agents, to the medium helps to increase the yield of citric acid.

CROSS-REFERENCE TO RELATED APPLICATION

This application is a continuation of copending application Ser. No. 692,690, filed on Dec. 22, 1967, now abandoned.

This invention relates to a process for producing citric acid. More particularly, it relates to a process for the production of citric acid by fermentation. Even more particularly, the invention relates to a process for converting n-paraffins in petroleum into citric acid by the use of microorganisms.

The starting material carbohydrates normally used in the conventional citric acid fermentation process are relatively expensive. Moreover, when using, for example, conventional blackstrap molasses as the starting material, the disadvantage is recognized of the bad influence of mixing of the inorganic substances from the starting material.

Citric acid is a well known chemical substance which is used in many applications. For example, citric acid finds use as an acidulant in beverages, in pharmaceutical sirups, in elixirs, in effervescent powders and tablets and the like. It is used to adjust the pH of foods and as a synergistic antioxidant in the processing of cheese. Other applications include its use as a sequestering agent for removing trace metals, as a mordant for brightening colors, as a reagent for albumin, mucin, glucose and bile pigments, etc. Citric acid has also been used in the medical field, for example, as a mild astringent.

One of the objects of the present invention is to provide an improved process for the production of citric acid which overcomes the disadvantages and deficiencies of the prior art methods.

Another object of the present invention is to provide a process for producing citric acid by fermentation which may be carried out in an efficacious and simple manner.

A further object of the invention is to provide a process for producing citric acid by fermentation which may be carried out advantageously on an industrial scale at low cost to give a high yield of product.

These and other objects and advantages of the present invention will become apparent to those skilled in the art from a consideration of the following specification and claims.

As the result of studies on the fermentation products obtained chiefly from n-paraffins by the use of natural isolate bacteria capable of assimilating hydrocarbons, for the purpose of substituting for the carbohydrate materials which are the starting material in the production of hydrocarbons by fermentation, the present inventors have succeeded in discovering bacteria which produce significant amounts of L-glutamic acid and α-ketoglutaric acid. Accordingly, a process for producing L-glutamic acid and α-ketoglutaric acid from n-paraffins as the main starting material has been established.

As a further result of examining these processes in detail, with the intention of making citric acid accumulate in the culture liquor based on the fact that remarkably significant amounts of L-glutamic acid and α-ketoglutaric acid are accumulated from n-paraffins as the main starting material, the present inventors have found that the various bacteria which are capable of utilizing hydrocarbons have the ability to produce and accumulate citric acid in a fermentation liquor using n-paraffins having from 9 to 30 carbon atoms as the principal source of carbon. Investigations have shown that citric acid may be produced in high yield by fermentation by using a strain of microorganism belonging to Arthrobacter paraffineus.

The Arthrobacter paraffineus strain used in the present invention was isolated from soil. The bacteriological properties thereof are shown in the following.

(A) MORPHOLOGICAL PROPERTIES

Shape of bacterium: usually short rod, shape and size are irregular, branching, curved or club form are found in comparatively long cells and coccoid cells are also found
Size: usually 0.5—0.8 x 1–3 micron coccoid cells, 0.6–0.8 micron
Motility: non-motile
Spore: no formation
Acid-fast staining: not acid-fast
Gram's staining: gram-positive or negative (mostly gram-negative for long form cells and mostly gram-positive for coccoid cells)

(B) CULTURING PROPERTIES (1) Agar colonies: Growth abundant, circular, smooth, entire, pale yellowish-brown, opaque, glistening
(2) Agar slant: Growth abundant, filiform, raised or flat, glistening, pale yellowish-grayish brown, butyrous
(3) Nutrient broth: Slightly turbid, slight flaky sediment

(C) PHYSIOLOGICAL PROPERTIES (1) Optimum temperature: 20°–30° C. (slight growth at 37° C.)
(2) Optimum pH: 6.0–8.0
(3) Relation to free oxygen aerobic, facultatively anaerobic
(4) Litmus milk: unchanged or alkaline
(5) Gelatin stab: liquefaction: none
(6) Hydrogen sulfide: negative
(7) Indole production: negative
(8) Hydrolysis of starch: negative
(9) Action on nitrate: no nitrite
(10) Catalase: positive
(11) Urease: positive
(12) Abundantly grows by utilizing n-paraffins as a carbon source and produces a large quantity of L-glutamic acid from n-paraffins or acetic acid
(13) Produces acid from fructose and mannitol
(14) In the case of using acetic acid or n-paraffins as a carbon source in a Hucker's medium, $NH_4H_2PO_4$ cannot be utilized as a single nitrogen source The taxonomical position of the bacterium described above was identified according to "Bergey's Manual of Determinative Bacteriology," 7th Edition (1957).

The present bacterium belongs to the family Corynebacteriaceae because it is a rod-form bacterium having the properties of being not spore forming, non-motile, not acid-fast, gram-positive (gram-variable), aerobic and branching. The family Corynebacteriaceae has six genera, namely, Corynebacterium, Listeria, Erysipelothrix, Microbacterium, Cellulomonas, and Arthrobacter. The genus Listeria consists of small rod bacteria which are motile. The genus Erysipelothrix has the property of having long filament forms. The genus Microbacterium has a heat-resistant property, and the genus Cellulomonas has the ability to decompose cellulose. Accordingly, the present bacterium is considered not to belong to these genera.

The present bacterium should thus belong to the genus Corynebacterium or the genus Arthrobacter. However, the present strain is a typical soil bacterium with gram-variable and coccoid cells which are scarcely produced at 37° C. From these facts, it is regarded as appropriate to classify the strain of the present invention as belonging to the genus Arthrobacter.

Differences among *Arthrobacter ureafaciens*, *Arthrobacter terregens* and a hydrocarbon-assimilatory bacterium S10B1 reported by Yamada et al. [Agricultural and Biological Chemistry, volume 27, 773 (1963)], which are considered to be the most analogous to the bacterium of the present invention, and *Arthrobacter paraffineus* are shown in the following table.

n-eicosane, n-heneicosane, n-docosane, n-tricosane, n-triacontane, etc. Crude raw materials containing n-paraffins may also be employed with effectiveness. Mixtures of two or more n-paraffins can be utilized as the source of carbon.

Small amounts of other carbon sources such as glucose, fructose, mannose, galastose, sucrose, starch hydrolysate, waste molasses, etc. may also be used in the fermentation medium together with the hydrocarbon compound or compounds.

As a nitrogen source, various kinds of inorganic or organic salts or compounds, such as urea or ammonia or ammonium salts such as ammonium sulfate, ammonium chloride, ammonium nitrate, etc., or natural substances containing nitrogen such as cornsteep liquor, peptone, meat extract, yeast extract, casein hydrolysates, fish meal, etc. may be employed. Mixtures of two or more of these nitrogen sources may be used.

Inorganic compounds which may be added to the culture medium include magnesium sulfate, potassium dihydrogen phosphate, potassium monohydrogen phosphate, sodium chloride, iron sulfate, as well as other conventionally used salts of magnesium, iron, manganese, zinc, calcium and the like. Mixtures of such inorganic compounds may also be employed.

Furthermore, in order to produce citric acid in high yield in accordance with the process of the present invention, calcium carbonate should be added to the culture medium. Moreover, the addition of urea, higher fatty acid salts or esters, various kinds of surface active agents and methanol is effective in increasing the yield of citric acid which is produced. Reference is hereby made to copending application Ser. No. 600,402 of Saito et al., filed Dec.

TABLE 1

| | Arthrobacter paraffineus | Arthrobacter ureafaciens | Arthrobacter terregens | S10B1 |
|---|---|---|---|---|
| Agar colonies | Pale yellowish-brown | Yellow | Yellowish-brown | Yellowish-brown. |
| Agar slant | Filiform, pale yellowish-grayish brown | Filiform, yellow | Filiform, pale brown | Filiform, pale yellowish-brown. |
| Nutrient broth | Slight turbid sediment | Moderate turbidity, pale yellow sediment | Moderate turbidity, yellow sediment | Almost transparent sediment. |
| Optimum temperature of growth | 20°–30° C | 32° C | 20°–26° C | 25°–30° C. |
| Oxygen requirement | Aerobic to facultatively anaerobic | Aerobic | Aerobic | Aerobic. |
| Gram's staining | Positive or negative | Negative | Negative or variable | Positive. |
| Litmus milk | Unchanged or alkaline | Unchanged | Unchanged | Unchanged or alkaline. |
| Gelation stub | No liquefaction | Liquefaction | No liquefaction | No liquefaction. |
| Hydrogen sulfide | Negative | Positive | Negative | Positive. |
| Indole production | do | Negative | do | Negative. |
| Hydrolysis of starch | do | do | do | Positive. |
| Nitrate | No nitrite | No nitrite | Nitrite | Nitrite. |
| Catalase | Positive | Positive | Positive | Positive. |
| Urease | do | Negative | Negative | |

The *Arthrobacter paraffineus* strain of the present invention has been deposited with the American Type Culture Collection in Rockville, Md., and given ATCC catalog number 15591.

Either a synthetic culture medium or a natural nutrient medium is suitable in the present invention as long as it contains the essential nutrients for the growth of the strain employed and, in accordance with the present invention, contains a hydrocarbon as the main carbon source therein. Such nutrients are well known in the art and include substances such as a carbon source, a nitrogen source, inorganic compounds and the like which are utilized by the microorganism employed in appropriate amounts.

The carbon source to be employed principally comprises hydrocarbons and, in particular, n-paraffins having from 9 to 30 carbon atoms. Preferred for a high yield of production of citric acid are n-paraffins having from 10 to 18 carbon atoms. Examples thereof include straight-chain paraffins (alkanes) such as n-decane, n-undecane, n-dodecane, n-tridecane, n-tetradecane, n-pentadecane, 9, 1966, and to copending application Ser. No. 643,832 of Tanaka et al., filed June 6, 1967, with respect to the types of surface active agents which may be employed in increasing the yield of citric acid when carrying out the fermentation process of the present invention.

The fermentation employed herein to obtain citric acid is conducted under aerobic conditions, such as aerobic shaking of the culture or with stirring of a submerged culture, at a temperatupre of about 20 to 40° C. and at a pH of about 4 to 9. After about 3 to 7 days of culturing under these conditions, remarkably large amounts of citric acid are found to be accumulated in the culture medium.

After the completion of fermentation, the citric acid may be separated from the fermentation liquor by conventional means, such as ion exchange resin treatment, chromatography, precipitation, extraction, or the like.

The following examples are given merely as illustrative of the present invention and are not to be considered as limiting. Unless otherwise noted, the percentages therein and throughout the application are by weight.

Example 1

Twenty ml. of a culture medium having the following composition (per liter of water) is prepared in a 500 ml. Sakaguchi flask:

5.0% n-dodecane
0.2% $KH_2PO_4$
0.1% $MgSO_4 \cdot 7H_2O$
0.005% $MnSO_4 \cdot 4H_2O$
0.02% $FeSO_4 \cdot 7H_2O$
0.5% $NH_4NO_3$
0.1% urea
10 mg./l. thiamine
3.0% $CaCO_3$ Then, 1 ml. of a seed culture liquor of *Arthrobacter paraffineus* ATCC 15591, obtained by conducting a shaking culture in a liquid boullion medium at 30° C. for 24 hours, is inoculated into the fermentation medium. Culturing is carried out with aerobic shaking of the culture at 28° C. for 96 hours.

The amount of citric acid accumulated in the culture liquor at the completion of culturing is 10 mg./ml.

Example 2

Culturing is conducted in a culture medium which is the same as that described in Example 1 except that 0.05% of Tween 40 (polyoxyethylene sorbitan-monopalmitate) is added to the medium. Culturing is carried out under the same conditions as set forth in Example 1 for 96 hours. The amount of citric acid accumulated in the culture liquor is 15 mg./ml.

Example 3

Three liters of a culture medium having the following composition is put into a 5 liter jar fermentor and sterilized:

0.2% $KH_2PO_4$
0.1% $MgSO_4 \cdot 7H_2O$
0.005% $MnSO_4 \cdot 4H_2O$
0.02% $FeSO_4 \cdot 7H_2O$
1.0% $NH_4NO_3$
0.2% urea
3.0% $CaCO_3$
0.01% cornsteep liquor
0.05% polyoxyethylene glycol-monostearate The pH of the culture medium is about neutral. A culture liquor of *Arthrobacter paraffineus* ATCC 15591, obtained by culturing with aerobic shaking in a culture medium consisting of 1.0% of meat extract, 1.0% of peptone, 0.5% of sodium chloride and 1.0% of sorbitol at a pH of 7.2, is inoculated into the fermentation medium in an amount of 5%. Culturing is then carried out at 28° C. with agitation at 600 r.p.m. and with aeration at the rate of 1 liter per liter of sterile air per minute for 72 hours. At the beginning of culturing, 200 ml. of n-paraffins containing from 12 to 14 carbon atoms is added to the culture medium.

The amount of citric acid found to be accumulated in the culture liquor at the completion of culturing is 28 mg./ml. After treating the solution according to conventional means, 60 grams of citric acid is obtained therefrom.

Example 4

*Arthrobacter paraffineus* ATCC 15590 is used, and the other cultivation conditions are similar to that of Example 1. After cultivating for 96 hours, 9.5 mg./ml. of citric acid is accumulated in the culture liquor.

It will be clear to those skilled in the art that variations are wholly within the scope of the present invention in producing citric acid from hydrocarbons as the main starting material by fermentation. Thus, for instance, as shown in Example 3, hydrocarbon mixtures containing n-paraffins are quite suitable in practicing the present invention.

The invention being thus described, it will be obvious that the same may be varied in many ways. Such variations are not be be regarded as a departure from the spirit and scope of the invention, and all such modifications are intended to be included within the scope of the following claims.

We claim:
1. A process for producing citric acid which comprises culturing a bacterium capable of assimilating hydrocarbons and belonging to *Arthrobacter paraffineus* in an aqueous nutrient medium containing n-paraffins as the principal source of carbon under aerobic conditions and accumulating and recovering citric acid from the resultant culture liquor.

2. The process of claim 1, wherein said bacterium is *Arthrobacter paraffineus* ATCC 15591.

3. The process of claim 1, wherein said bacterium is *Arthrobacter paraffineus* ATCC 15590.

4. The process of claim 1, wherein culturing is carried out at a temperature of about 20° to 40° C. and at a pH of about 4 to 9.

5. The process of claim 1, wherein said n-paraffins contain from 9 to 30 carbon atoms.

6. The process of claim 1, wherein said n-paraffins contain from 10 to 18 carbon atoms.

7. The process of claim 1, wherein said nutrient medium also contains a surface active agent therein.

8. The process of claim 1, wherein said nutrient medium also contains at least one additive selected from the group consisting of calcium carbonate, higher fatty acid salts or esters and methanol.

9. A process for producing citric acid which comprises culturing *Arthrobacter paraffineus* in an aqueous nutrient medium containing at least one n-paraffin of 9 to 30 carbon atoms as the principal source of carbon under aerobic conditions and accumulating and recovering citric acid from the resultant culture liquor.

10. The process of claim 9, wherein culturing is carried out at a temperature of about 20° to 40° C. and at a pH of about 4 to 9.

11. The process of claim 10, wherein the microorganism is *Arthrobacter paraffineus* ATCC 15591.

12. The process of claim 10, wherein the microorganism is *Arthrobacter paraffineus* ATCC 15590.

13. The process of claim 9, wherein said nutrient medium also contains calcium carbonate.

14. The process of claim 13, wherein said nutrient medium also contains at least one polyoxyethylene surface active agent.

15. The process of claim 8, wherein a raw material containing n-paraffins of 9 to 30 carbon atoms is employed as the source of carbon in the nutrient medium.

References Cited

UNITED STATES PATENTS 3,419,469  12/1968  Humphrey _____ 195—28 R

LIONEL M. SHAPIRO, Primary Examiner